US005774972A

United States Patent [19]

Ehrlich

[11] Patent Number: 5,774,972

[45] Date of Patent: Jul. 7, 1998

[54] METHOD OF PUNCHING A COMPOSITE PLATE

[75] Inventor: Rodney P. Ehrlich, Monticello, Ind.

[73] Assignee: Wabash National Corporation, Lafayette, Ind.

[21] Appl. No.: 620,999

[22] Filed: Mar. 22, 1996

[51] Int. Cl.$^{6}$ .............................. B23P 11/00; B26D 1/04; B21D 28/26

[52] U.S. Cl. .............................. 29/525.06; 29/525.01; 83/19; 83/50; 72/327

[58] Field of Search .............................. 29/525.01, 525.06, 29/525.05; 83/19, 39, 40, 49, 50, 55, 176, 140, 136, 138; 72/327, 328, 333, 334

[56] References Cited

U.S. PATENT DOCUMENTS

| | | | |
|---|---|---|---|
| 2,185,885 | 1/1940 | Bruker et al. | 83/176 X |
| 2,371,734 | 3/1945 | Butress | 83/138 X |
| 2,419,862 | 4/1947 | Wales | 83/50 X |
| 4,940,279 | 7/1990 | Abott et al. . | |
| 4,958,472 | 9/1990 | Erlich | 52/584 |
| 5,040,442 | 8/1991 | Nasu | 83/39 X |

FOREIGN PATENT DOCUMENTS

| | | | |
|---|---|---|---|
| 723340 | 4/1932 | France | 83/50 |
| 1435301 | 11/1968 | Germany | 83/176 |
| 56-165531 | 12/1981 | Japan | 72/327 |
| 2-80134 | 3/1990 | Japan | 83/40 |
| 2111896 | 7/1983 | United Kingdom | 83/176 |

*Primary Examiner*—S. Thomas Hughes

*Attorney, Agent, or Firm*—Trexler, Bushnell, Giangiorgi & Blackstone, Ltd.

[57] ABSTRACT

A novel method is provided for forming a clear hole through a composite plate. In the present method, the hole is twice-punched by a punching apparatus. At least two plates can be joined together to form a wall of a trailer. Each composite plate is formed from top and bottom skins having a resilient core sandwiched therebetween. The bottom skin of one plate and the top skin of the adjacent plate each include an integrally formed skin extension which extends past the end of the respective cores and overlaps the respective top or bottom skin on the adjacent plate. To perform the method, the following steps are taken: The composite plates are placed adjacent to each other and the punching apparatus is engaged with the plate to be punched to compress the plate core material. The punching apparatus punches through the plate and skin to form a hole therethrough. The apparatus is then withdrawn from its engagement and the core is allowed to expand into the hole. Next, the apparatus is re-engaged with the plate and skin and compresses the core. The apparatus re-punches through the plate and skin in the same location as the first-punched hole to shear any excess material from within the hole. The punching apparatus is then re-withdrawn from its engagement. After being punching twice, the hole is clear and free of any interfering material. A rivet can be easily placed through the hole to join the plates together.

13 Claims, 6 Drawing Sheets

METHOD OF PUNCHING A COMPOSITE PLATE

BACKGROUND OF THE INVENTION

This invention is generally directed to a novel method of punching a composite plate. Specifically, the novel method of the present invention uses a punching apparatus to twice punch a hole through a composite plate to form a hole free of interfering materials.

Prior art methods of punching a hole in a composite plate, which are formed of top and bottom skins with a core sandwiched therebetween, were done by punching a hole through the plate with a single punch by using a punching apparatus. Due to the spring back qualities of the core material, the core material enters into the hole formed by the punch after the punch is removed from its engagement with the plate. Therefore, the hole created by the punch is not clear and a rivet could not be placed therethrough without first completely clearing the hole by using separate, special tools.

The special tools are used to drill out or remove the excess core material within the hole. These tools are expensive and the process of removing the excess core material is labor intensive.

Therefore, there is a need for a method of punching a composite plate which eliminates the step of drilling out or removing excess core material within the hole by using a separate tool. The invention disclosed herein presents a method which eliminates this step. In addition, the method of the present invention presents several other advantages and features including the provision of a novel joint structure which will become apparent upon a reading of the attached specification.

OBJECTS AND SUMMARY OF THE INVENTION

A general object of the present invention is to provide a novel method of punching a composite plate by using a punching apparatus to punch a hole through the plate twice in the same hole area to provide a hole through the composite plate which is free of interfering material.

An object of the present invention is to provide a novel method of providing a clear hole through a composite plate without using a separate tool to remove excess material from the hole.

Briefly, and in accordance with the foregoing, the present invention discloses a novel method for forming a clear hole through a composite plate. The composite plate is twice-punched in a particular manner by a punching apparatus through the same hole area to form the clear hole. At least two plates can be joined together to form a wall panel, such as may be used in a trailer.

Each composite plate is formed from top and bottom skins having a resilient core sandwiched therebetween. The bottom skin of one plate and the top skin of the adjacent plate each include an integrally formed skin extension which extends past the end of the respective cores and overlaps the respective top or bottom skin on the adjacent plate.

To perform the method, the following steps are taken: The composite plates are placed adjacent to each other such that the ends of the plates abut against each other and the skin extensions overlap the respective top or bottom skin of the composite plate. Thereafter, the punching apparatus is engaged with the plate to be punched to compress the plate core material. The punching apparatus punches through the plate and skin to form a hole therethrough. The apparatus is then withdrawn from its engagement and the core is allowed to expand into the hole due to the spring back qualities of the resilient core material. Next, the apparatus is re-engaged with the plate and skin and compresses the core. The apparatus re-punches through the plate and skin in the same location as the first-punched hole to shear any excess material from within the hole. The punching apparatus is then re-withdrawn from its engagement with the composite plate. After punching twice through the same hole area, the hole is clear and free of any interfering material. A rivet can be easily placed through the hole to join the plates together.

Of course, a composite plate having only top and bottom skins and a core can be punched by using the novel method described herein to form a hole clear of any interfering material. That is, a composite plate, without the provision of an overlapping skin can be punched by using this method.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE PREFERRED EMBODIMENT

Figure 2:
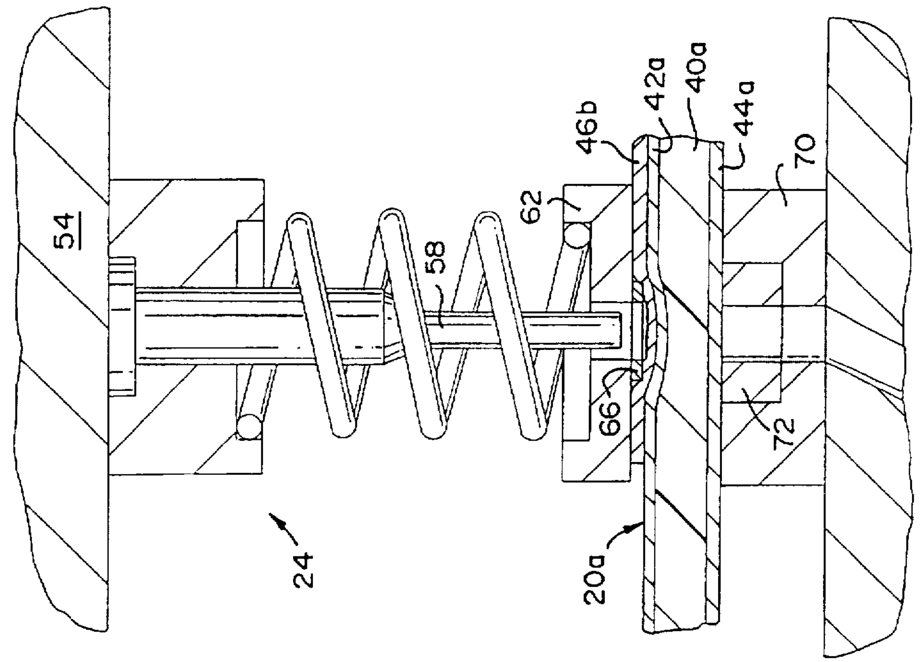
FIG. 2 is a cross-sectional view of the punching apparatus showing the stripper plate applying pressure to the composite plate and prior to the punch being engaged with the composite plate for a first time.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

The present invention presents a novel method of punching a composite plate 20a, 20b form a hole 22 through the plate 20a, 20b which is clear and free of interfering materials in the hole 22. In the present invention, the composite plate 20a, 20b is punched twice by a punching apparatus 24 through the same area to form and completely clear the hole 22 through the composite plate 20a, 20b. No separate tools, as are necessary in prior art methods of forming a hole through a composite plate, are required to clear out the hole after the composite plate is punched by the method described herein.

Figure 12:
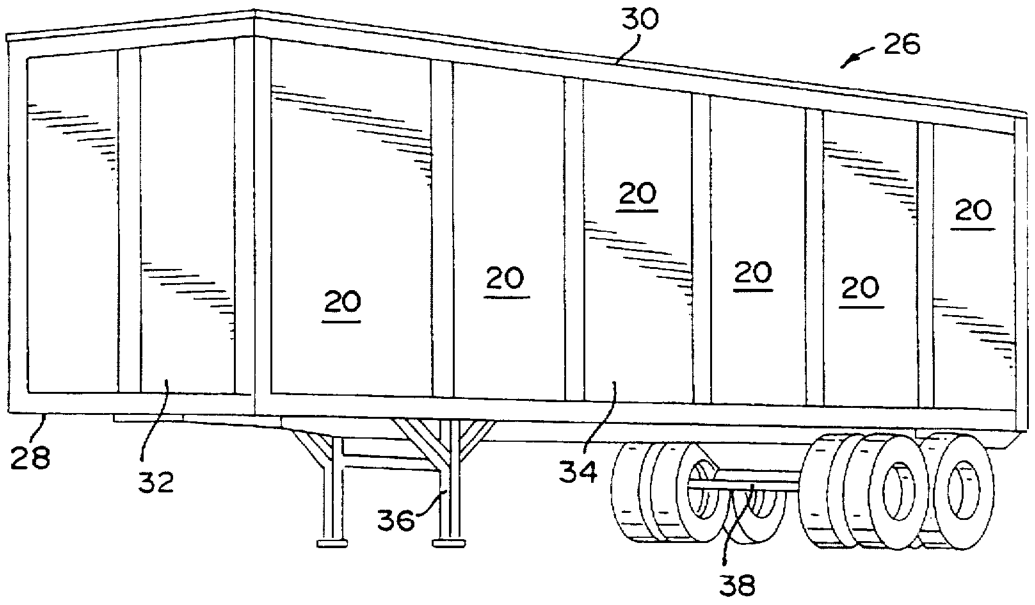
FIG. 12 is a perspective view of a trailer in which the twice-punched composite plate is used to form a side wall of the trailer.

The composite plate 20a, 20b formed in accordance with the present invention can be used to form a wall panel in a trailer 26, shown in FIG. 12. The trailer 26 is generally comprised of a floor 28, a roof 30, a front wall 32, a pair of opposite side walls 24 (only one of which is shown), rear cargo doors (not shown), a landing gear 36, and an undercarriage assembly 28.

Each side wall 34 and the front wall 32 of the trailer 26 is formed from a plurality of composite plates 20a, 20b. Preferably, each composite plate 20a, 20b is rectangular having a height greater than its width. The composite plates 20a, 20b can be relatively equal in size or the width and thickness of each plate 20a, 20b may vary.

Composite plate 20a is formed from a core 40a sandwiched between a top skin 42a and a bottom skin 44a. Composite plate 20b is formed from a core 40b sandwiched between a top skin 42b and a bottom skin 44b. The skins 42a, 42b, 44a, 44b are preferably formed of full hard, high strength, high tension, galvanized steel. Preferably, the top skin 42a, 42b is formed from G60 (60 grams/meter) galvanized steel and the bottom skin 44a, 44b is formed from G90 (90 grams/meter) galvanized steel. The core 40a, 40b is preferably made of a light-weight, resilient plastic material, such as high density polyethylene (HDPE) or polypropylene. The skins 42a, 42b, 44a, 44b may be adhesively bonded or otherwise affixed to the core 40.

Figure 11:
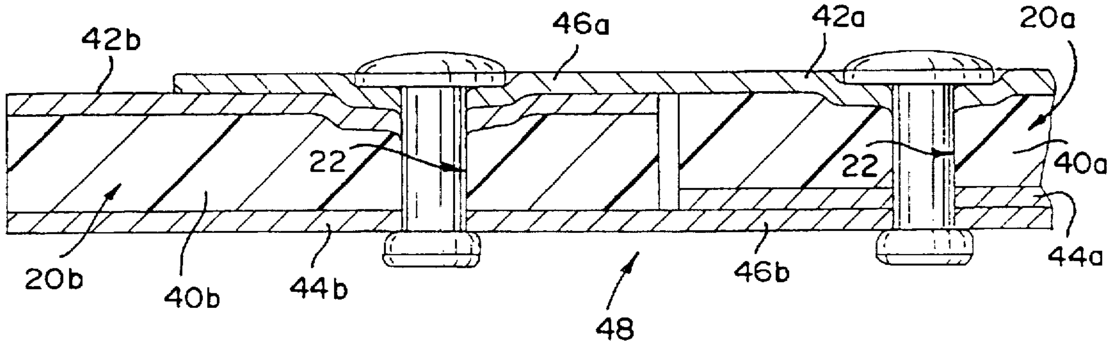
FIG. 11 is a cross-sectional view of adjacent composite plates attached together by rivets to form a joint.

FIG. 11 shows the preferred construction of joined or spliced adjacent composite plates 20a, 20b in the final form which are used to form the side walls 34 and the front wall 32 of the trailer 26. Such a construction of joined or spliced adjacent composite plates is disclosed in U.S. Pat. No. 4,940,279, which disclosure is herein incorporated by reference. Each composite plate 20a, 20b in the preferred construction is provided with a skin extension 46a, 46b integral with the respective top or bottom skin of the composite plate 20a, 20b which extends beyond the end of the core 40a, 40b to overlap the respective skin 42b, 44a of the adjacent composite plate 20a, 20b. The ends of the plates 20a, 20b abut directly against one another. The skin extensions 46a, 46b form an overlap joint 48 for joining the adjacent plates 20a, 20b together. As shown, the skin extension 46a which is integral with the bottom skin 44a of composite plate 20a overlaps the bottom skin 44b of composite plate 20b, and the skin extension 46b which is integral with the top skin 42b of composite plate 20b overlaps the top skin 42a of composite plate 20a. The skin extensions 46a, 46b seat tightly against the respective top and bottom skins 42b, 44a.

Each composite plate 20a, 20b (without the respective skin extension 46a, 46b) is approximately forty nine inches in length. Each skin 42a, 44a; 42b, 44b and each skin extension 46a, 46b is preferably nineteen thousandths of an inch in thickness. The overall thickness of each composite plate 20a, 20b is approximately two hundred and thirty thousands of an inch.

To join or splice the composite plates 20a, 20b together, the novel method of the present invention described herein is used. The composite plates 20a, 20b are punched in the area of the overlap joint 48, that is, through the composite plate 20a or 20b and the respective skin extension 46a, 46b. For ease and clarity in describing the present invention, the punching method is described with respect to the composite plate 20a and the skin extension 46b which overlaps the top skin 42a of the composite plate 20a, except where the composite plate 20b and bottom skin extension 46a are specifically described. It is to be understood that the method of the present invention can be used to punch a composite plate that does not include a skin extension to provide a clear hole through the composite plate. In addition, the method of the present invention can be used to punch other forms of joints between composite plates.

The composite plate 20a and skin extension 46b are punched twice by the punching apparatus 24 in the same location to form the hole 22 which is free of any interfering material. Preferably, in the particular embodiment disclosed, the holes 22 formed in the composite plate 20a are one and a quarter inches apart from each other along a four foot plate.

The punching apparatus 24 includes a top structure 50 and a bottom structure 52. The composite plate 20a is placed between the structures 50, 52 during the novel punching process described herein.

The top structure 50 generally includes a press ram 54, a punch holder 56, a punch 58, a spring 60 having a predetermined spring constant and a stripper plate 62. The top structure 50 can be moved upwardly and downwardly relative to the bottom structure 52.

The punch holder 56 and punch 58 are fixedly attached to the press ram 54 and extend downwardly therefrom toward the bottom structure 52. The punch 58 may have any desired diameter, but in the embodiment disclosed, the punch 58 preferably has a diameter of approximately two hundred and sixty-five thousands of an inch.

One end of the spring 60 is connected to the punch holder 54 and the other end is connected to an upper surface of the stripper plate 62. The punch 58 is positioned through the middle of the spring 60 and is aligned with a bore 64 through the stripper plate 62. The stripper plate 62 includes an embossment 66 thereon which extends downwardly from a plate engaging surface 68 and encircles the bore 64 in the stripper plate 62. The embossment 66 is approximately twenty thousands of an inch (slightly less than the thickness of one skin of the composite plate). Other dimension for the embossment 66 and skins of the composite plate may be used depending on the application.

The bottom structure 52 generally includes a die holder 70, a die 72 and a press frame 74. The bottom structure 52 is stationary.

The die holder 70 is attached to and extends upwardly from the press frame 74. The die 72 is seated within the die holder 70. The die holder 70 and the die 72 each have a passageway 76, 78, respectively, therethrough which are aligned with each other. The press frame 74 includes a chute 80 therethrough which is in communication with the passageways 76, 78 through the die holder 70 and die 72. The passageways 76, 78 through the die holder 70 and die 72 are aligned with the bore 64 through the stripper plate 62.

Attention is now directed to FIGS. 1–8 which show the novel method of the present invention. In the method of the present invention, the punching apparatus 24 is used to twice punch the composite plate 20*a* and skin extension 46*b* in the same area to form a hole 22 which is clear of interfering core material.

Figure 1:
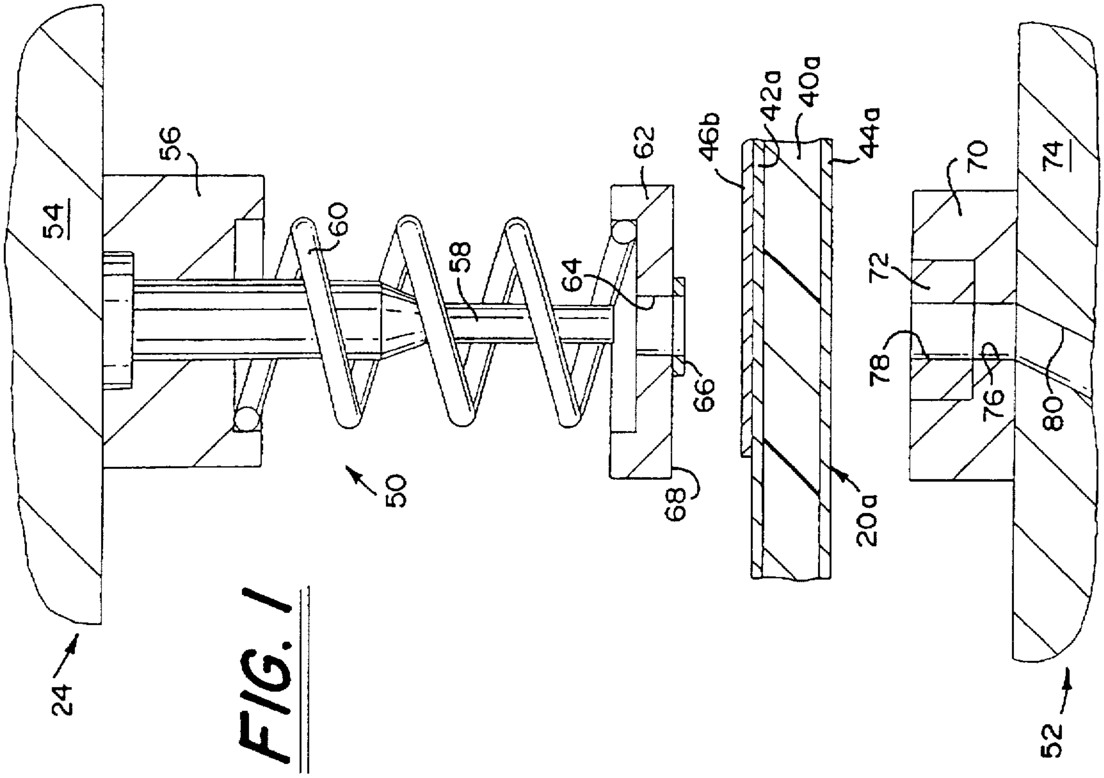
FIG. 1 is a cross-sectional view of a punching apparatus for punching a hole through a composite plate, such apparatus including a press ram, a punch, a stripper plate and a die.

In FIG. 1, the punching apparatus 24 is shown disengaged from the composite plate 20*a* which is to be punched. The composite plate 20*a* is placed between the top structure 50 and the bottom structure 52 of the punching apparatus 24.

As shown in FIG. 2, the punching apparatus 24 is engaged with the composite plate 20*a*, but prior to the punch 58 being passed through the composite plate 20*a*. The lower surface of the bottom skin 44*a* of the plate 20*a* rests on the die holder 70 and die 72. The stripper plate 62, with the embossment 66, is brought into contact with the upper surface of the skin extension 46*b* by moving the top structure 50 downwardly toward the bottom structure 52.

As the press ram 54 pushes the stripper plate 62 down onto the skin extension 46*b*, pressure is applied to the composite plate 20*a* which causes the core 40*a* of the composite plate 20*a* to compress. For example, the punching apparatus 24 applies 6,000 pounds of pressure on the stripper plate 62 per hole. The embossment 66 presses against the skin extension 46*b* and causes a portion 79, 81 of each of the skin extension 46*b* and the top skin 42*a* and a portion of the core 40*a* to slightly deform around the embossment 66. If the composite plate 20*a* is being punched through a portion where the skin extension 46*b* is not present or if a portion of the overlap joint 48 which is formed by the composite plate 20*b* is being punched, the embossment 66 presses against the top skin 42*a*, 42*b*, respectively, of the composite plate 20*a*, 20*b*.

Figure 3:
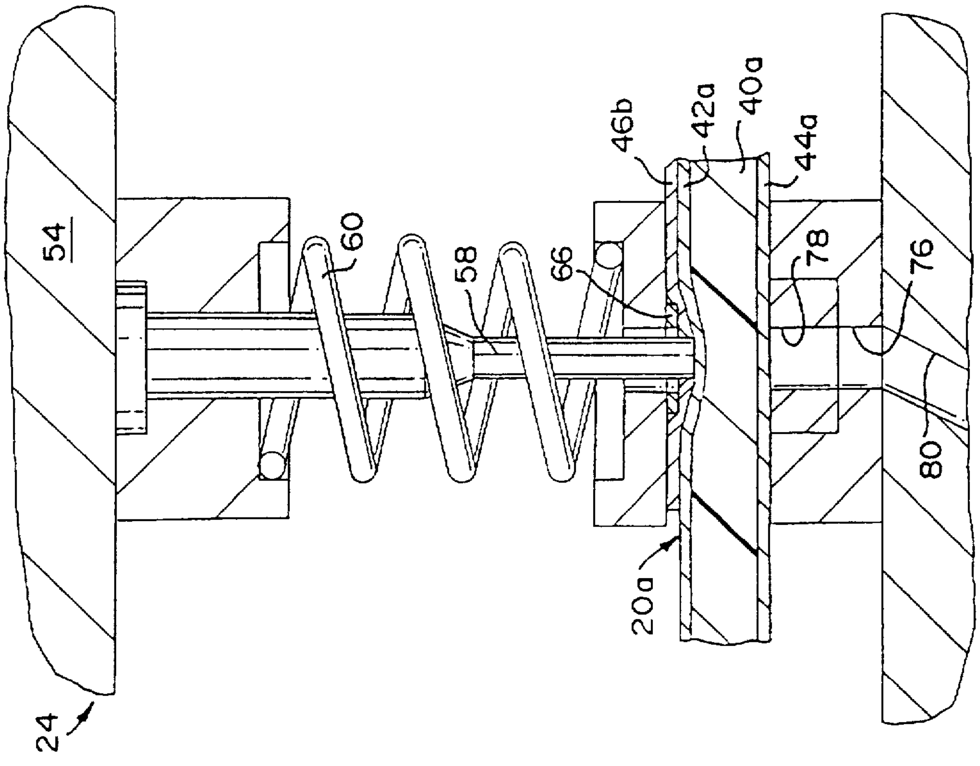
FIG. 3 is a cross-sectional view showing the punch of the punching apparatus passing through the composite plate for the first time.

To punch the composite plate 20*a*, as shown in FIG. 3, the press ram 54 continues its downward movement which causes the punch 58 to punch through the skin extension 46*b* and the top skin 42*a* once the spring constant of the spring 60 is overcome. As the punch 58 is driven into and through the plate 20*a*, the spring 58 between the stripper plate 62 and the punch holder 54 is compressed. As the punch 58 passes through the skin extension 46*b* and the top skin 42*a*, the punch 58 deforms the skin extension 46*b* and the top skin 42*a* slightly by causing the portion 79, 81 of each of the skin extension 46*b* and the top skin 42*a* around the hole formed by the punch 58 to bend slightly inward toward the core 40*a*.

After the punch 58 breaks through the top skin 42*a* of the composite plate 20*a*, the core 40*a* is compressed and displaced outwardly from the punch 58 as the punch 58 enters the core 40*a*. As the punch 58 passes through the core 40*a* of the plate 20*a*, additional core compression cuts or tears the core 20*a* from underneath the punch tip and forms a slug 82. As the punch 58 moves through the core 40*a*, the slug 82 is pushed through the core 40*a*. When the punch 58 reaches the bottom skin 44*a* of the plate 20*a*, the core 40*a* has been displaced outward around the punch penetration area.

Figure 4:
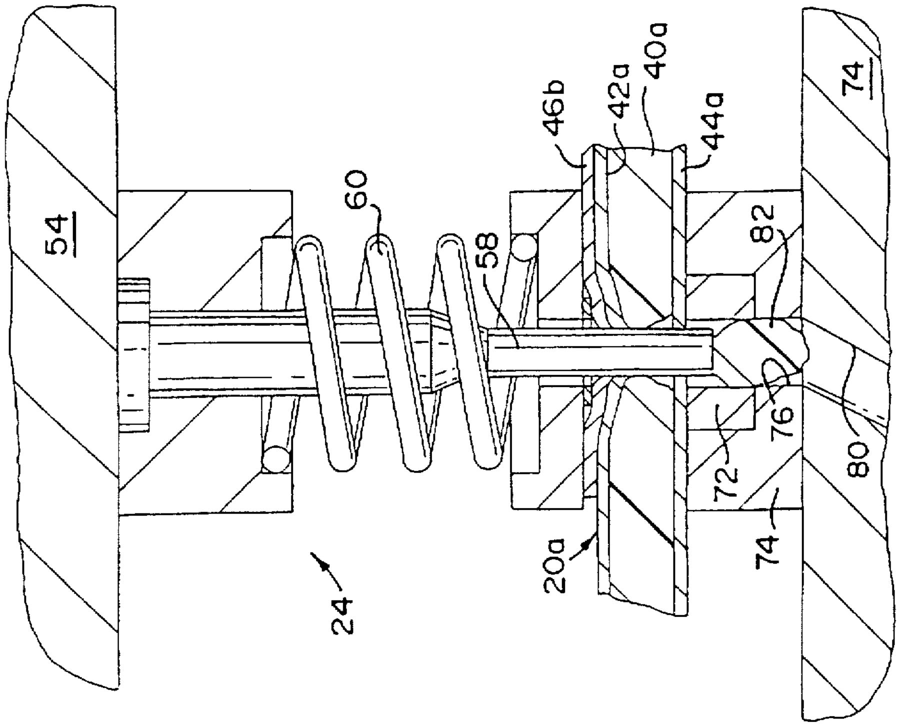
FIG. 4 is a cross-sectional view showing the punch of the punching apparatus as it has passed completely through the composite plate for the first time.

As shown in FIG. 4, as the punch 58 breaks through the bottom skin 44*a*, the slug 82 is deposited into the passageway 78 through the die 72. The slug 82 passes through the passageways 76, 78 in the die holer 70 and die 72 and then downwardly through the chute 80 in the press frame 74 to a collection area (not shown).

Figure 5A:
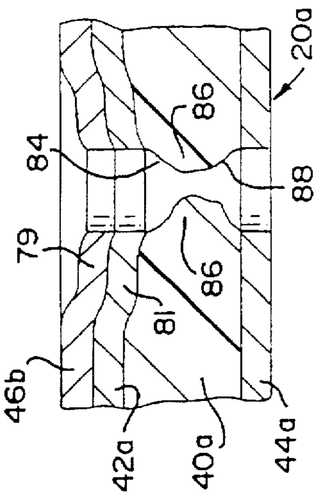
FIG. 5*a* is an enlarged, cross-sectional view of the hole formed in the composite plate after the first punch.
Figure 5B:
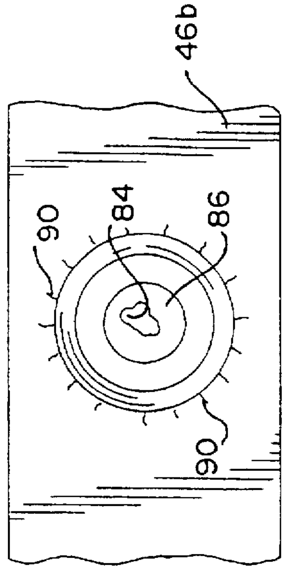
FIG. 5*b* is a top plan view of the hole formed in the composite plate after the first punch.
Figure 5C:
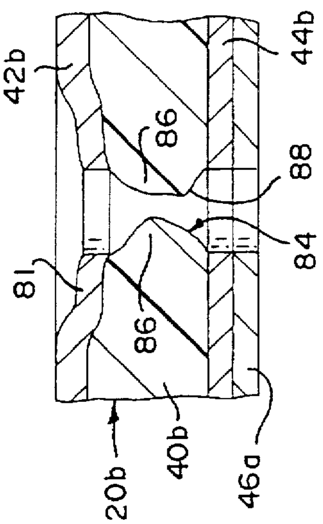
FIG. 5*c* is an enlarged, cross-sectional view of a hole formed in the composite plate after the first punch in a different section of the composite plate.
Figure 5:
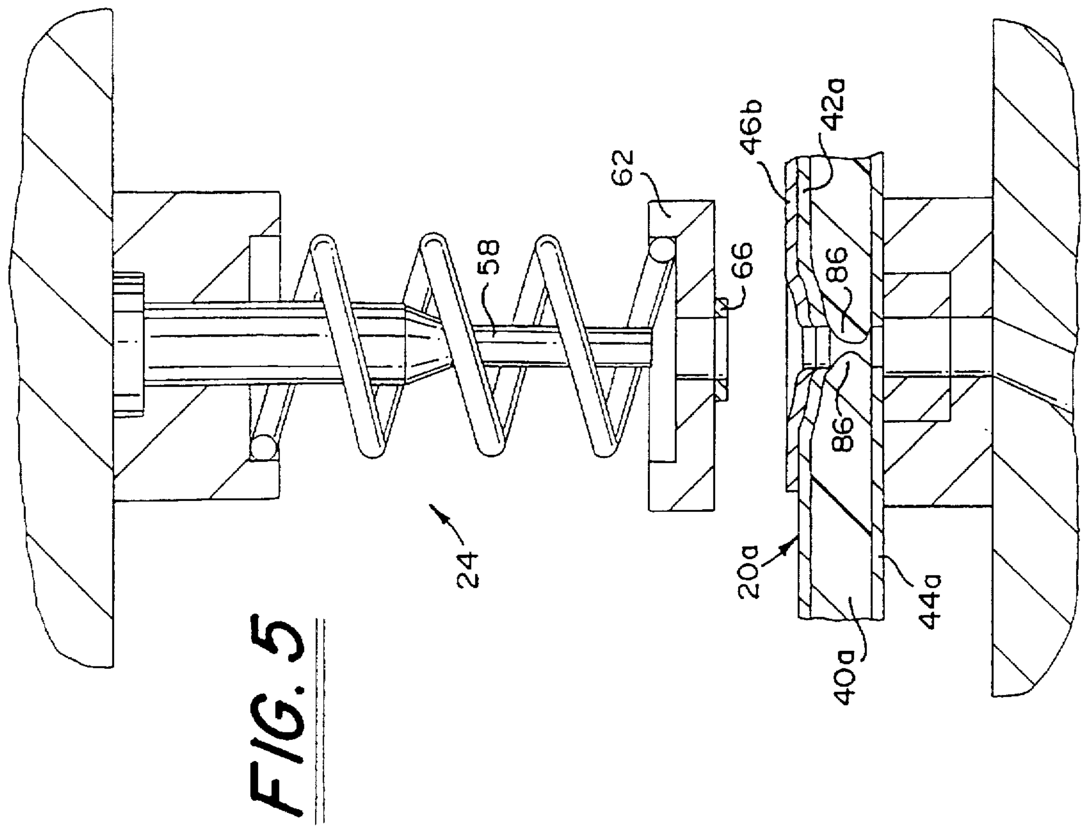
FIG. 5 is a cross-sectional view showing the punch disengaged from the composite plate after the first punch.

Thereafter, the punch 58 is removed from its engagement through the composite plate 20*a*, such that the pressure from the top structure 50 is removed, leaving a hole 84 as shown in FIG. 5. As the press ram 54 moves upwardly, the spring 60 expands.

As shown in FIG. 5, the punching apparatus 24 is disengaged from the composite plate 20*a* such that the punch 58 and the stripper plate 62 are withdrawn from engagement with the composite plate 20*a* and a hole 84 is formed. Due to the resiliency of the core material, a portion 86 of the core material springs back into the hole 84 when the punch 58 is removed.

Alternatively, the top structure 50 may be moved upwardly to a point where the punch 58 is completely disengaged with its contact with the composite plate 20*a*, but the stripper plate 62 maintains contact with the composite plate 20*a* and is no longer applying a significant amount of pressure on the composite plate 20*a*. This would allow the core material to spring back into the hole 84 when the punch 58 is removed due to the resiliency of the core material.

FIGS. 5*a* and 5*c* show that the core material springs back into the hole 84 in such a manner so as to partially block the once-punched hole 84 through the plate 20*a*, 20*b*, respectively. Therefore, at this time, a rivet cannot be placed through the hole 84 due to the core material 86 which interferes with the hole 84. If the method used in the prior art were employed here, a separate tool would now be used to drill out the interfering material 86 in the once-punched hole 84.

FIG. 5*a* shows the once-punched hole through the composite plate 20*a* that has the skin extension 46*a* which overlaps the top skin 42*a*. FIG. 5*c* shows the once-punched hole through the composite plate 20*b* that has the skin extension 46*a* which overlaps the bottom skin 44*b*. The inward deformation of portions 79, 81 of the skin extension 46*a* and the top skin 42*b* around the edges of the hole 84 are exaggerated for clarity in showing the deformation.

As shown in FIGS. 5*a* and 5*c*, the inner wall 88 of each hole 84 is convex such that the interfering core material 86 protrudes inwardly toward the center of the hole 84 after the composite plate 20*a*, 20*b* has been punched once with the punching apparatus 24. For example, testing has found that the interfering core material 86 forms a minimum diameter in the hole 84 of one hundred and eighty-five thousands of an inch when the punch 58 has a diameter of two hundred and sixty-five thousands of an inch. Of course, the amount of spring-back is dependent on the amount of pressure placed on the composite plate 20*a*, 20*b* when the plate 20*a*, 20*b* is compressed by the punching apparatus 24 and the thickness of the core material.

As shown in FIG. 5*b*, due to the pressure on the top skin extension 46*a* (or top skin 42*a*, 42*b* when that portion of the respective composite plate is punched) from the stripper plate 62 and the punch 58 and because the top skin 42*a*, 42*b* is backed up by the yieldable core material, the galvanization on the skin 46*a*, 42*a*, 42*b* may break and form very small cracks 90 in the skin extension 46*b* (or skin 42*a*, 42*b*) when the portions 79, 81 of the skin extension 46*b* (or skin 42*a*, 42*b*) around the hole 84 are deformed slightly inwardly towards the center of the hole 84. Therefore, the top skin 42*a*, 42*b* of each composite plate 20*a*, 20*b*, i.e. the skin that the punch 58 first contacts, is used as the interior wall of the trailer 26 in order to prevent or minimize the amount of rusting that will occur due to exposure to the elements. Galvanization breakage does not occur on the bottom skin 44*a*, 44*b* (or bottom skin extension 46*a*) of the composite plates 20*a*, 20*b* when the punch 58 punches therethrough because of the tight tolerance fit between the composite plates 20*a*, 20*b* and the die 72 which rigidly backs up the bottom skin 44*a*, 44*b* (or bottom skin extension 46*a*) of the composite plates 20*a*, 20*b* during the punching operation.

Figure 6:
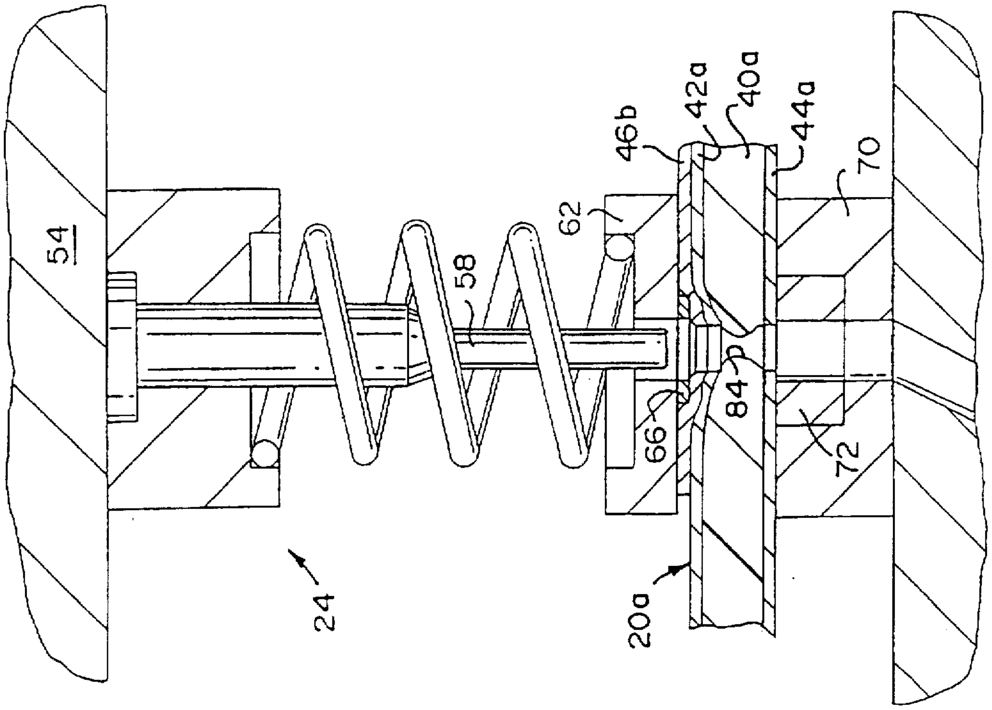
FIG. 6 is a cross-sectional view showing the punching apparatus applying pressure to the composite plate and prior to the punch being engaged with the composite plate through the same hole area for the second time.

To clear the area through the hole 84 so that a rivet may be passed therethrough, the composite plate 20*a* is punched again by the punching apparatus 24 through the same area as where the hole 84 is first punched. As shown in FIG. 6, the stripper plate 62, with embossment 66, is once again pressed against the skin extension 46*b* to compress the core 40*a* of the composite plate 20*a*. When the stripper plate 62 applies pressure to the composite plate 20*a*, the core 40*a* is again compressed and core material around the hole 84 is moved into the hole 84 due to the pressure on the composite plate 20*a* by the punching apparatus 24. Depending on the amount of compression on the core 40*a*, more core material than just the interfering material 86 may be moved into the hole area. At this point, the punch 58 is not engaged with the composite plate.

Figure 7:
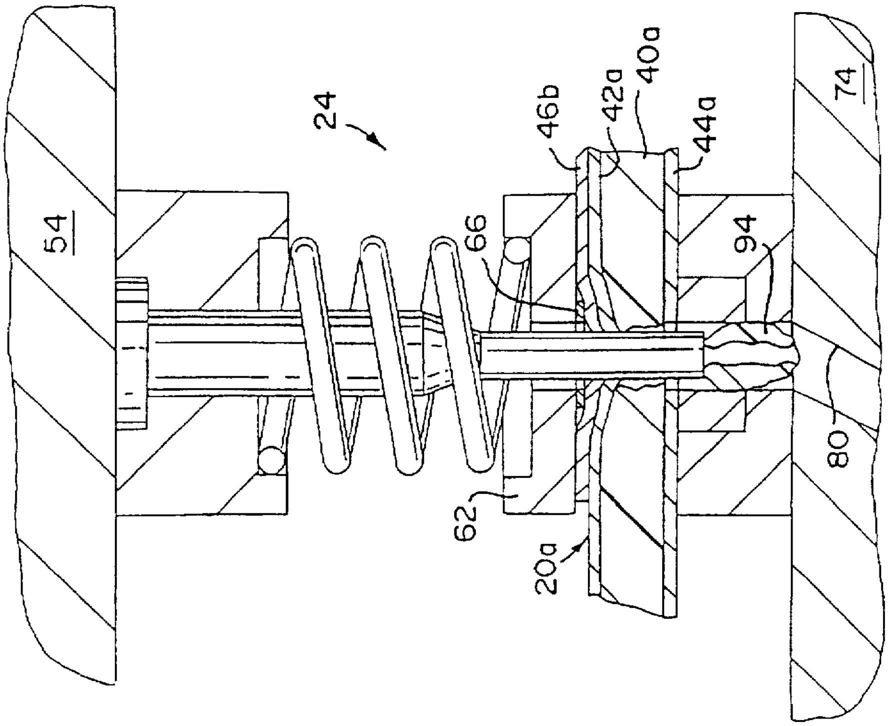
FIG. 7 is a cross-sectional view showing the punch completely through the composite plate for the second time.

Thereafter, as shown in FIG. 7, the punch 58 is passed through the composite plate 20*a* in a manner similar to that as described hereinabove. Of course, the punch 58 does not have to penetrate through the skin extension 46*b* and the top and bottom skins 42*a*, 44*a* because the punch 58 is being passed through the same hole already formed by the first punch. When the punch 58 passes through the plate 20*a*, the punch 58 shears the core 40*a* material that interferes with the punch 58 as it penetrates through the hole 84 for the second time. The slug 94 that is formed by the second punch passes through the passageways 76, 78 and through the chute 80 to the collection area.

Figure 8A:
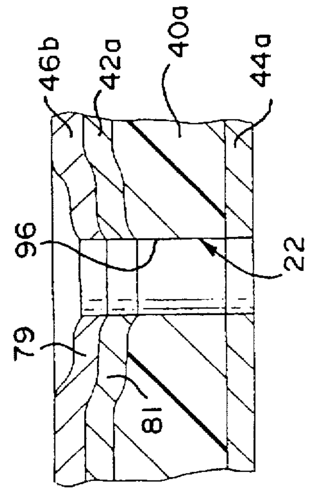
FIG. 8*a* is an enlarged, cross-sectional view of the hole formed by the punching apparatus after the second punch.
Figure 9:
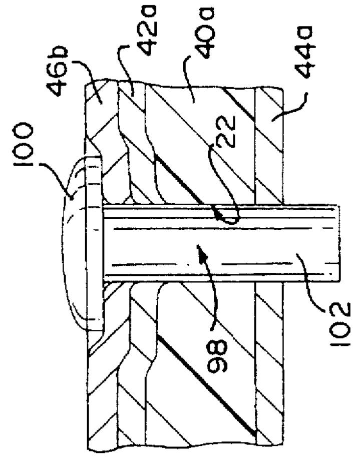
FIG. 9 is a cross-sectional view of the composite plate with a rivet, shown in elevation, inserted through the clear hole formed by the punching apparatus.
Figure 8:
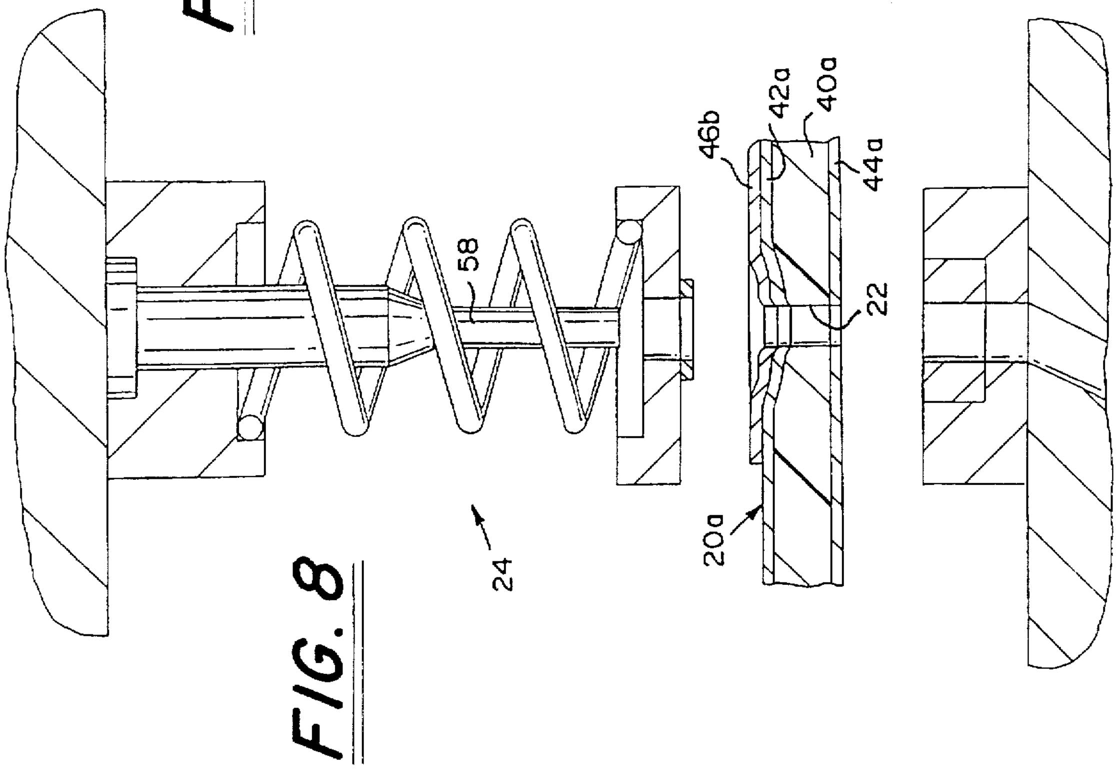
FIG. 8 is a cross-sectional view showing the punch disengaged from the composite plate after the second punch through the composite plate has been effected to form a clear hole.

Next, as shown in FIG. 8, the punching apparatus is withdrawn from the composite plate 20*a*, as described hereinabove. Some of the core material may spring back into the hole area, however, it is not sufficient to interfere with the clear hole 22 formed through the plate 20*a*.

Depending on the amount of material moved into the hole area because of the pressure placed on the core 40*a*, while the pressure from the top structure 50 is being placed on the composite plate 20*a* and after the punch 58 has completely penetrated the plate 20*a*, the core material around the hole area 84 may be generally concave, that is, the inner wall of the hole is concave outwardly from the center of the hole. If this occurs, when the pressure on the composite plate 20*a* by the punching apparatus is removed and the core material springs back into the hole area, the core material does not spring back far enough so as to enter into the hole 22.

FIG. 8*a* shows the twice-punched hole 22 through the composite plate 20*a* and the skin extension 46*b*. The inner wall 96 of the hole 22 formed after the second punch in accordance with the present method is generally straight. The portions 79, 81 of the skins 42*a*, 46*b* around the hole area are deformed (shown exaggerated) and the portion of the core 40*a* around the hole area is compressed. It is to be understood that the inner walls of the holes through other portions of the composite plates 20*a*, 20*b* that do not have the top skin extension 46*a* are also generally straight after being punched twice in accordance with the novel method described herein.

Figure 10:
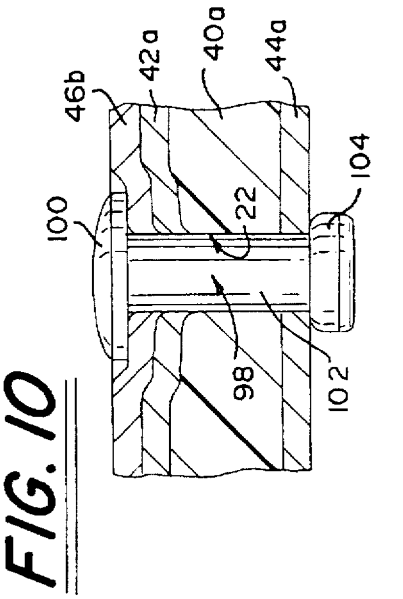
FIG. 10 is a cross-sectional view of the composite plate with the rivet assembled therewith and with the end of the rivet swaged and enlarged or upset so that the shank of the rivet expands to completely fill the hole through the twice-punched composite plate.

Thereafter, a rivet 98, having a head 100 and an elongated shank 102, may be easily passed through the clear, twice-punched hole 22 in the composite plate 20*a* (or plate 20*b*). Because of the formation of the downward deformation of the top skin extension 46*a* (or the top skin 42*a*, 42*b* if that portion is punched) by the embossment 66, the edges of the rivet head 100 sit beneath the upper surface of the skin extension 46*b* (or the top skin 42*a*, 42*b*). This prevents or at least minimizes the possibility of an article snagging the edge of the rivet head 100 which could cause the rivet head 100 to shear off of the shank 102. As shown in FIG. 10, the opposite end 104 of the rivet 98 is swaged and enlarged or upset to secure the rivet 98 to the plate 20*a*.

If any irregularities are formed along the inner wall of the hole 22 during the punching process, a space will be formed between the rivet shank 102 and the inner wall of the hole 22. When the end 104 of the rivet 98 is swaged and enlarged or upset to secure the rivet 98 to the composite plate 20*a*, the rivet shank 102 expands to fill any such spaces so as to provide a tight uniform fit between the rivet shank 102 and the inner wall of the twice-punched hole 22.

Depending on the amount of pressure placed on the composite plate 20*a*, 20*b* by the punching apparatus 24, the inner wall of the hole 22 after being twice-punched, may be slightly convex or concave. If the inner wall of the hole 22 is convex, this aids in forming a tight fit between the rivet shank 102 and the core 40*a*. If the inner wall of the hole 22 is concave, such that the inner wall is undercut the top and bottom skins 42*a*, 44*a* of the plate 20*a*, when the rivet end 104 is swaged, the rivet shank 102 expands so as to fill any space between the inner wall of the hole 22 and the rivet shank 102.

While preferred embodiments of the present invention are shown and described, it is envisioned that those skilled in the art may devise various modifications of the present invention without departing from the spirit and scope of the appended claims.

The invention claimed is:

1. A method of forming a hole in a composite plate comprising the steps of:

(a) providing a composite plate having a first skin, a second skin and a core of resilient material between said first and second skins;

(b) providing a punching apparatus having a punch;

(c) advancing said punch through said composite plate to form a hole through said composite plate while simultaneously compressing said resilient core material;

(d) withdrawing said punch from said composite plate to allow an excess portion of the core material to expand into said hole;

(e) re-punching said hole by engaging said punch through said hole to remove any excess core material which has expanded into said hole; and (f) withdrawing said punch from said composite plate for a second time.

2. A method as defined in claim 1, wherein step (b) further comprises providing a stripper plate which is selectively engageable with said first skin of said composite plate to apply pressure to said composite plate during steps (c) and (e).

3. A method as defined in claim 1, wherein step (c) comprises applying pressure to said composite plate to compress said core and thereafter, passing said punch member through said composite plate.

4. A method as defined in claim 3, wherein step (e) comprises re-applying pressure to said composite plate to re-compress said core and thereafter, re-passing said punch member through said hole formed in step (c) to shear any interfering core material out of said hole.

5. A method of forming a joint through adjacent composite plates comprising the steps of:

(a) providing a first composite plate having a first skin, a second skin and a core of resilient material between said first and second skins;

(b) providing a second composite plate having a first skin, a second skin and a core of resilient material between said first and second skins of said second composite plate;

(c) placing ends of said first and second composite plates adjacent to each other;

(d) providing an overlapping skin which is connected to said first skin of said first composite plate and overlaps said first skin of said second composite plate;

(e) providing a punching apparatus having a punch;

(f) advancing said punch through said first composite plate and said overlapping skin to form a hole through said overlapping skin and said first composite plate;

(g) withdrawing said punch from said overlapping skin and said first composite plate to allow an excess portion of the core material of said first composite plate to expand into said hole;

(h) re-punching said hole by re-engaging said punch through said hole to shear any excess core material from within said hole;

(i) re-withdrawing said punching apparatus from said overlapping skin and said first composite plate; and (j) placing securing means through said hole to join said first and second composite plates together.

6. A method as defined in claim 5, wherein step (f) comprises applying pressure to said first composite plate to compress said resilient core of said first composite plate and thereafter, passing said punch through said overlapping skin and said first composite plate.

7. A method as defined in claim 6, wherein step (g) comprises withdrawing said punch from said overlapping skin and said first composite plate and relieving the pressure from the overlapping skin and said first composite plate and allowing the core of the first composite plate to expand into said hole.

8. A method as defined in claim 7, wherein step (h) comprises re-applying pressure to said first composite plate to re-compress said resilient core of said first composite plate and thereafter, re-passing said punch through said hole in said overlapping skin and said first composite plate to shear any interfering core material out of said hole.

9. A method as defined in claim 8, wherein step (j) comprises providing a rivet comprising a shank having first and second ends, and a head at said first end of said shank; passing said shank of said rivet through said hole; and securing said rivet to said first composite plate to prevent said rivet from disengaging from said hole.

10. The method as defined in 9, wherein said method is used to form a wall of a trailer.

11. A method as defined in claim 9, wherein said step j comprises deforming said second end of said shank.

12. A method as defined in claim 9, further including the step of embossing said overlapping skin to deform an area of said overlapping skin around said hole in which the rivet head is accepted when said rivet is engaged through said hole.

13. A method as defined in claim 9, further including the step of embossing said second skin of said first composite plate to deform an area of said second skin around said hole in which the rivet head is accepted when said rivet is engaged through said hole.

* * * * *

UNITED STATES PATENT AND TRADEMARK OFFICE

CERTIFICATE OF CORRECTION

PATENT NO. : 5,774,972

DATED : July 7, 1998

INVENTOR(S) : Rodney P.Ehrlich

It is certified that error appears in the above-indentified patent and that said Letters Patent is hereby corrected as shown below:

Column 3, Line 20 "20b form" should be -- 20b to form --

Column 3, Line 56 "40". should be -- 40a, 40b. --

Signed and Sealed this

Fifth Day of January, 1999

Attest:

Q. Todd Dickinson

*Attesting Officer*

*Acting Commissioner of Patents and Trademarks*